J. J. ROLL.
Bed or Cradle Guards.
No. 136,097.  Patented Feb. 18, 1873.
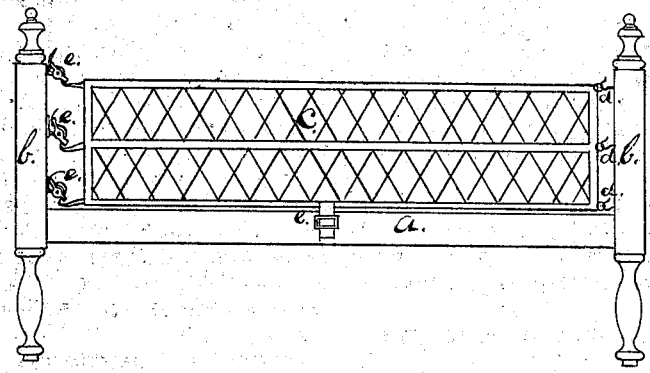
Witness
Horace Harris
Henry Lamb
Inventor
John James Roll

UNITED STATES PATENT OFFICE.

JOHN JAMES ROLL, OF NEWARK, NEW JERSEY.

IMPROVEMENT IN BED OR CRADLE GUARDS.

Specification forming part of Letters Patent No. 136,097, dated February 18, 1873.

*To all whom it may concern:*

Be it known that I, JOHN J. ROLL, residing in Newark, in the county of Essex and State of New Jersey, have invented a new and useful Improvement in Bed or Cradle Guard, of which the following is a full, clear, and exact description, reference being had to the annexed drawing, in which the figure illustrates a side view of my improvement, and of a sufficient number of parts of a bedstead to show its application.

The nature of this invention consists of a guard for a bed or cradle, composed of a net having suitable fastenings for attaching it to the bed or cradle, substantially as hereinafter more fully set forth.

To enable others to make and use my invention I will proceed to describe it.

In the drawing, C refers to a net, woven in a substantial manner, and which constitutes the guard. By thus constructing the guard the air is allowed to freely pass through it and reach the occupant of the bed or cradle; the guard caused to yield and prevent the occupant being injured should he, in a delirious state, in rolling about the bed strike against it; the patient's attendant enabled to see him without rising from his seat, as is necessary in the use of the solid guards; and, further, the guard rendered susceptible of being rolled together and stored away in a small space when not in use.

A duplicate one is adjusted to the opposite side of the bed or cradle.

Rings are suitably attached to and disposed upon the rear end of the guard, and receive hooks $d\ d$ connected to the rear post $b$, and straps $e\ e$ are likewise attached to its forward or other end, and couple with buckles looped to the head-post $b$. Through these means the guard is readily attached to and detached from the bed or cradle posts, while its lower or bottom end is connected to the side rail $a$ thereof by a similar strap and buckle, $e$. Of course, these fastenings are duplicated for the other guard.

Having thus described my invention, what I claim, and desire to secure by Letters Patent, is—

As an article of manufacture, the net-guard C, in combination with the hooks and rings $d\ d$, and buckles and straps $e\ e$, substantially as and for the purposes specified.

JOHN JAMES ROLL.

Witnesses:
 HORACE HARRIS,
 HENRY LAMB.